United States Patent
Kazama et al.

[11] 3,865,284
[45] Feb. 11, 1975

[54] DRESS FORM OF CELLULAR DOUBLE LAYER OF THERMOPLASTIC MATERIALS

[75] Inventors: Ken Kazama, Kyoto; Kunio Ohno; Mamoru Umegae, both of Kawasaki; Mineko Yonei, Takatsuki, all of Japan

[73] Assignee: Asahi Kasei Kogyo Kabushiki Kaisha, Osaka, Japan

[22] Filed: June 30, 1972

[21] Appl. No.: 267,932

[30] Foreign Application Priority Data
July 26, 1971  Japan................................ 46-55215

[52] U.S. Cl. .............................................. 223/68
[51] Int. Cl. ............................................ A41h 5/00
[58] Field of Search ............................ 223/66, 68

[56] References Cited
UNITED STATES PATENTS

| | | | |
|---|---|---|---|
| 2,056,740 | 10/1936 | Rosenfeld | 223/68 |
| 2,158,895 | 5/1939 | Brown | 223/68 |
| 2,533,906 | 12/1950 | Akers | 223/68 |
| 3,362,593 | 1/1968 | Cram et al. | 223/68 |
| 3,472,435 | 10/1969 | Maze | 223/68 |
| 3,525,458 | 6/1970 | Mason et al. | 223/68 |

Primary Examiner—G. V. Larkin
Attorney, Agent, or Firm—Armstrong, Nikaido & Wegner

[57] ABSTRACT

A dress form including a layered wall having the external form of the human torso and having an outer cellular layer of a thermoplastic polymeric material which has an elastic modulus of 500 to 10 kg/cm$^2$, the expansion ratio of the layer being 2 to 20; and integral to the outer cellular layer an inner cellular layer of a thermoplastic polymeric material having a Young's modulus of 2,000 to 50,000 kg/cm$^2$. The dress form is capable of faithfully reproducing the lines and relief of the human body, is light in weight, tough and shows an excellent performance for pin work.

3 Claims, 3 Drawing Figures

FIG. 1
FIG. 2
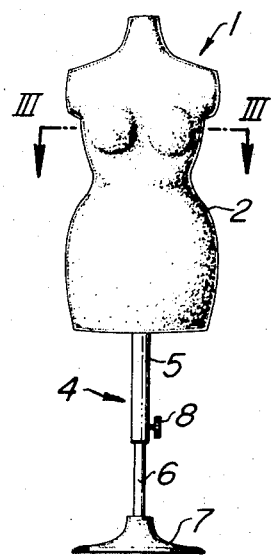
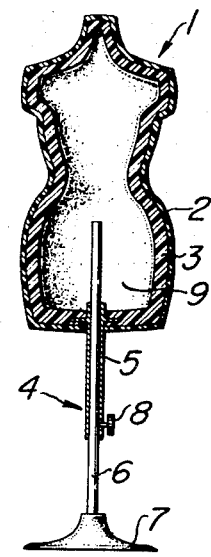
FIG. 3
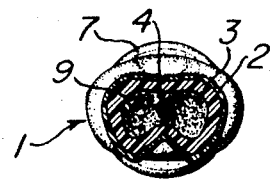

DRESS FORM OF CELLULAR DOUBLE LAYER OF THERMOPLASTIC MATERIALS

BACKGROUND OF THE INVENTION

This invention relates to a dress form for making and repairing garments, and checking designs of garments and for other related purposes and to a process for manufacturing the same.

The prerequisites for such a dress form are a faithful reproduction of delicate relief, which has been worked out with due regard to both of the lines of the human body and the necessary allowances for locomotion of the human body and for the sake of garment-making, and a satisfactory behavior in pin work including an ease in sticking and unsticking of a pin, firm holding of the stuck pin, and substantial closing of the pin hole. Other necessary characteristics of a form include low slipperiness for a fabric, softness and elasticity approximating the human skin, cleanness and fineness in appearance with soil resistant surface, lightness in weight allowing easy transportation, toughness, and durability. It is needless to say that a dress form is desired, in addition, to be manufactured at a low cost.

For the purpose of meeting the above requirements, there have heretofore been known dress forms such as the one made of molded gypsum or paper and lined with cotton, wool or cloth, or further over-lined with a plastic film to protect the surface against soiling, and the one in which cellular polystyrene is used as a core material to reduce the weight. These conventional dress forms, however, are not only expensive because their manufacture depends mostly on manual work and requires a great deal of labor, but also of various defects such as poor reproducibility in quality, poor reproducibility of the body lines and relief, excessive weight, fragility, inconvenience for transportation, susceptibility to soiling, and deficiency or even lack of the quality for pin work.

This invention is to solve the above-mentioned problems and to achieve various objects which will be mentioned below.

An object of this invention is to provide a fine dress form, which faithfully reproduces the lines and relief of the human body.

Another object of this invention is to provide a process for manufacturing in a short period of time a great number of dress forms, which have an even quality.

A further object of this invention is to provide a dress form, which has a feeling of the human body.

A still further object of this invention is to provide a dress form which has the necessary pin work quality for one to work sticking pins into the form.

A still further object of this invention is to provide a dress form, from which a dress will not slip off so that a desirable working on the dress may be ensured.

A still further object of this invention is to provide a dress form, which is resistant to soililng and can easily be cleaned even if it is soiled.

A still further object of this invention is to provide a dress form, which is light in weight, durable, difficult to break, and convenient for transportation.

A still further object of this invention is to provide a process for manufacturing a dress form, which may achieve the objects enumerated above.

Other objects and advantages of this invention will become apparent from the following description.

In the accompanying drawings,

FIG. 1 is the front view of an example of a dress form within this invention,

FIG. 2 is the longitudinal sectional view of the main part of the form and shows its structure, and FIG. 3 is a horizontal sectional view near the breast line of the form shown in FIGS. 1 and 2.

The dress form of this invention will be explained below with reference to these drawings.

In FIGS. 1 and 2, there is shown a form of a female torso within this invention.

As shown in FIGS. 2 and 3, the form 1 is composed of a soft outer cellular layer 2 and a rigid inner cellular layer 3.

The outer cellular layer 2 is not only formed in faithful conformity with the shape of the mold used in manufacturing the form, with satisfactory reproducibility, but also excellent in the feeling which approximates that of the human body. The inner cellular layer 3 is formed integrally with the outer cellular layer in the molding operation so as to be intimately fused to the latter layer 2.

The thickness of the outer cellular layer 2 is preferably 2 to 20 mm, more preferably 3 to 10 mm. If the thickness exceeds 20 mm, the conduction of heat to the inner resin layer tends to be decreased so much that the heating period must be greatly increased, resulting in coarser cells which are deleterious for the pin work characteristics of the form. A thickness of less than 2 mm is undesirable because of insufficient holding power for the stuck pin.

The thickness of the inner cellular layer is preferably 3 to 30 mm, more preferably 5 to 20 mm. A thickness of less than 3 mm tends to make the strength insufficient not only for retaining the shape of the whole form but also for fixing a pole to support the form. A thickness exceeding 30 mm is undesirable because the period for both molding and cooling will become markedly increased or the molding becomes even impossible.

The means 4 for supporting the main part of the form consists of an extendable member 5 and an extendable member 6, extending along a vertical axis passing near the center of gravity into the inner cavity 9, as shown in FIGS. 2 and 3. In FIG. 2, the extendable member 5 is inserted into the form during the molding operation and anchored in the inner rigid layer. Alternatively, the extendable member 5 can be fixed after the molding. The extendable member 6 is fixed on a base 7. A locking device such as a locking screw 8 is provided in the member 4 to hold the form at any desired level.

The dress form of this invention has many advantageous properties as enumerated below.

1. In working on a garment using the present dress form, the sticking and unsticking of pins are easy and the resulting pinholes are almost perfectly closed without remaining as holes; hence an excellent ability for holding the pins is not deteriorated even if the pins are repeatedly stuck at the same spots.

2. It has an adequate softness, elasticity, and a feeling which approximates that of the human body.

3. There is little slipping tendency between a cloth and the dress form.

4. It is resistant to soiling and, even if soiled, can be cleaned by a simple treatment.

5. It is light in weight and it is tough.

6. It is durable, being insensitive to moisture.

7. It can be colored freely, and is capable of being given a variety of beautiful appearances.

The material for use in manufacturing the present dress form, which has the above-mentioned properties, is a soft thermoplastic polymeric material having an elastic modulus (ASTM D 882) of 500 to 10 kg/cm$^2$, preferably 400 to 10 kg/cm$^2$, and preferably a rubber-like elasticity. Such a material is made ultimately into a foam which forms the outer layer of the dress form.

The thermoplastic polymeric material for use in this invention is selected from thermoplastic polyurethanes, styrene-butadiene block copolymers, chlorinated polyethylenes, ethylene-vinyl acetate copolymers, ethylene-acrylate copolymers, ethylene-methacrylate copolymers, ethylene-propylene copolymers, ionic ethylene copolymers (ionomers), and the like. These materials are used alone or in admixture of two or more.

These resins belong to a group of polymeric materials which are generally called thermoplastic elastomers which behave as thermoplastic resins when heated and behave as rubber-like elastomers at low temperatures and at about ordinary temperature. Among these materials, preferred are ethylene-vinyl acetate copolymers, ethylene-acrylate copolymers, ethylene-methacrylate copolymers, ethylene-propylene copolymers, and ionomers. Of these, an ethylene-vinyl acetate copolymer is the most preferable material because it has a reduced odor and excellent physical properties, and is inexpensive. While ethylene-vinyl acetate copolymers have properties resembling those of polyethylene with a high elastic modulus when the content of vinyl acetate units is low, the elastic modulus of the copolymer decreases as said content increases. When the content of vinyl acetate unit is within a range of 7 to 60 percent by weight, the copolymers show characteristic softness and rubber-like elasticity. However, when the content of vinyl acetate unit is within a range of 40 to 60 percent, the copolymer becomes difficult to process, though the elastic modulus decreases markedly, because of difficulty in pulverization into a powder by a conventional means, and even if it is successfully pulverized, the particles tend to block each other, resulting in poor pourability. Therefore, the ethylene-vinyl acetate copolymer having an elastic modulus of 500 to 10 kg/cm$^2$ for use in this invention should have a content of vinyl acetate unit within the range of 7 to 40 percent, preferably 10 to 35 percent by weight.

It might be considered possible, in view of only the function of the dress form, to make the form with a single cellular layer of those polymeric materials which have a softness and a rubber-like elasticity. However, such a cellular layer is too soft to maintain a right shape of the whole form and, beside being easily deformed by a contact pressure, lacks a sufficient rigidity as a dress form to be supported on a stand. Consequently, it becomes necessary to use a much heavier cellular layer or to use filler materials in the cavity of the form. The present inventors have confirmed that a laminated structure composed of an outer elastic layer and an inner cellular layer of a thermoplastic polymeric material with a sufficient rigidity as a structural member is light in weight and most effective. Suitable rigid polymeric materials for such an inner cellular layer are those thermoplastic materials which have a Young's modulus (ASTM D-790) of 2,000 to 50,000 kg/cm$^2$. Examples of these thermoplastic polymeric materials include high-density polyethylene, low-density polyethylene, polypropylene, polystyrene, rubber-blended polystyrene, acrylonitrile-styrene copolymer, acrylonitrile-butadiene-styrene copolymer, polyvinyl chloride, polyamide, polyacetal, polyethylene glycol terephthalate, polycarbonate, and the like. These materials may be used alone or in combination. Of these, the most preferred materials are high-density polyethylene and low-density polyethylene, because these materials have a thermal stability sufficient for withstanding the thermal conditions for a rotational molding, which is an especially suitable method for manufacturing the dress form of this invention.

The dress form of this invention has a double cellular layer structure made of two types of polymeric materials. The expansion ratio of the outer layer is preferably from 2 to 20. When the expansion exceeds 20 times, the stuck pin will be difficult to held, while the pin can be stuck with difficulty when the expansion is less than 2 times.

The expansion ratio of the inner layer is preferably from 2 to 10. When the expansion exceeds 10 times, the extendable member which is anchored in the inner cellular layer becomes unstable in supporting the form, while the dress form increases undesirably in weight and cost when the expansion is less than 2 times.

The process for manufacturing the dress form of this invention will be mentioned below.

As a result of extensive research on the method for manufacturing the above-mentioned dress form, the present inventors have found that in order to duplicate accurately the lines and relief of the human body, a rotational molding method capable of forming two cellular layers in a single cycle of operation is the most suitable and rational method available for a large scale production.

The term "rotational molding method" used herein means a known method for obtaining molded hollow articles by charging a closed mold with a thermoplastic resin powder, then heating the mold, while being rotated, to form a molten resin layer on the inner surface of the mold, and finally cooling the mold to solidify the molten resin.

The procedure for manufacturing the dress form of this invention by the above-mentioned rotational molding method will be explained below. It is desirable to form simultaneously the outer cellular layer and the inner cellular layer during a single cycle of the rotational molding using materials containing two types of the above-mentioned thermoplastic polymeric substances as the main components. For this purpose, the polymeric material for the outer cellular layer is used in the form of an expandable powder incorporated with a blowing agent having a higher decomposition temperature than the melting point or softening point of said polymeric material, and the polymeric material for the inner cellular layer is used in the form of an expandable bead or pellet incorporated, by milling, with a blowing agent having a higher decomposition temperature than the melting point or softening point of said polymeric material. A mixture of these powder and beads or pellets is charged into a mold, and the mold is rotated in an atmosphere heated at a temperature higher than the decomposition temperatures of the blowing agents. Owing to rotational motion of the mold, at first, the powder having a smaller particle size melts into a molten layer on the inner wall of the mold, and the bead or pellet having a relatively larger particle size then begins to melt and adheres to the inner surface of the molten layer of the powder to form an inner molten layer. Then, foaming takes place in both molten layers by decomposition of the blowing agents. When a desirably formed article is produced in the mold, heating is discontinued, the mold is externally cooled, and subsequently the product is removed from the mold.

The powder for use in the above-mentioned process for manufacturing the dress form of this invention is that having a particle size of 50 to 800 $\mu$, preferably 70 to 400 $\mu$. In preparing such a powder, any known method, such as impact pulverization, can be used.

The beads or pellets for use in the above-mentioned process are those having a particle size of 2 or more times that of the above-said powder and up to 5 mm, preferably in the range of 1 to 3 mm. When the particle size is less than 2 times that of the powder, separation of the beads or pellets from the outer layer becomes incomplete, while a particle size exceeding 5 mm is undesirable because not only much more time is required in melting the beads or pellets, but also the layer becomes irregular in thickness.

The blowing agents to be incorporated in the thermoplastic polymeric materials to form the outer and inner cellular layers which compose the dress form of this invention include inorganic compounds such as sodium bicarbonate, ammonium carbonate, and the like, and organic compounds of the azo type, nitroso type and hydrazide type such as azodicarbonamide, azobisisobutyronitrile, dinitrosopentamethylenetetramine, p,p'-oxybis-benzenesulfonyl hydrazide, p-toluenesulfonyl hydrazide, and the like. These compounds may be used alone or in admixture. The blowing agents for use in this invention are not limited to those enumerated above.

Additives for use in manufacturing the dress form of this invention are not limited to the blowing agents. There may be used blowing aids, crosslinking agents, crosslinking aids, dyes, pigments, and other additives and fillers incorporated in the polymeric material. The incorporation of the blowing agent and, if necessary, the above-said additives and fillers can be effected by means of a mill, an extruder or a high-speed rotating mixer and other known equipments. The blending should be carried out at a temperature below the decomposition temperature of the blowing agent.

The mold for use in this invention is made preferably by casting aluminum, an aluminum alloy or a zinc alloy or by electroforming using copper or nickel, the original model used as a master being made of gypsum or clay. Since a molded article perfectly duplicates the detail of the mold, there are precisely reproduced the lines and relief of the original model as well as the size of every part of the original model in the dress form of the invention. Moreover, by applying an appropriate retouch to the original model, there may be reproduced on the dress form various lines or surface patterns representing the median line, neckline, bust line, waist line, hip line. etc., whilst representation of these lines on a conventional dress form has been unsatisfacotry. Moreover, the support for the form and, if necessary, metal fixtures for connecting detached limbs can be provided as metal inserts during the molding operation.

EXAMPLE 1

An ethylene-vinyl acetate copolymer containing 28 percent vinyl acetate unit and having a metl index (ASTM D-1238) of 4.0 g/10 min. and an elastic modulus (ASTM D-882) of 95 kg/cm$^2$ was milled with 1 percent of azodicarbonamide (decomposition temperature about 200°C) in an extruder at 140° to 160°C, then extruded and pulverized in a pulverizer to obtain an expandable powder, 100 to 380 $\mu$ in particle size.

On the other hand, a high-density polyethylene having a melt index of 7.0 g/10 min., a density of 0.950 g/cm$^3$ and a Young's modulus (ASTM D-790) of 12,000 kg/cm$^2$ was milled with 1.5 percent of azodicarbonamide (decomposition temperature, about 185°C) in an extruder at 150° to 170°C, then extruded into a rod of about 2 mm diameter, and cut to 2 mm length to obtain pellets. 1.5 Kilograms of the pellets and 2.5 kg of the above-obtained expandable powder of ethylene-vinyl acetate copolymer were charged into a hollow mold made of an aluminum alloy having an internal volume of about 33 liters. The charged mold was heated for 15 minutes in an oven at 350°C (air temperature), while being rotated Around two axes. Subsequently, the mold was discharged from the oven, cooled in air for 5 minutes, then in water for 10 minutes, and opened to discharge the molded article therefrom. The article duplicated accurately the detail of the mold and consisted of two cellular layers: an outer layer of expanded ethylene-vinyl acetate copolymer, about 6 mm in mean thickness, the expansion ratio being about 3, and an inner layer, closely adhered to the outer cellular layer, of expanded high-density polyethylene, about 5 mm in mean thickness, the expansion ratio being 5.

The soft skin of the molded article had a rubber-like elasticity and showed an excellent recovery of the original state after having been pierced with a needle of 0.5 mm diameter, into a depth of 3 to 5 mm 200 times in succession at the same spot; after the test, were observed neither noticeable pinholes nor decrease in firmness with which the stuck needle is held in the place, indicating an excellent performance for pin work. The article was tough and no crack was observed on free dropping to a concrete base from a height of 1.5 m without making any provision against position of the article at the moment of hitting the concrete base.

EXAMPLES 2 to 5

Using the same mold as in Example 1 and following, in principle, the procedure of Example 1, the present invention was practised under various conditions as shown in Table 1. The results obtained were as shown in Table 1. As is seen from Table 1, it is evident that the dress forms within this invention show an excellent performance so long as the manufacturing conditions remain within the range specified herein.

Table 1

| Example No. | 2 | 3 | 4 | 5 |
|---|---|---|---|---|
| Expandable powder for outer cellular layer | | | | |
| Thermoplastic polymeric material | Ethylene-vinyl acetate copolymer | Ethylene-ethyl acrylate copolymer | Ethylene-vinyl acetate copolymer | Thermoplastic polyurethane ("Paraprene 22-S", trade name of Polyurethane Co., Ltd.) |
| Melt index (g/10 min) | 2.5 | 6.0 | 3.5 | |
| Elastic modulus (kg/cm$^2$) | 190 | 340 | 250 | 50 |
| Blowing agent — name | Azodicarbonamide | Azodicarbonamide | Azodicarbonamide | p,p'-Oxybis-benzensulfonyl hydrazide |
| Blowing agent — concentration (%) | 1.2 | 0.8 | 1.0 | 0.8 |
| Particle size (μ) | 80–170 | 110–380 | 105–380 | 110–380 |
| Weight (kg) | 2.3 | 2.5 | 2.5 | 2.5 |
| Expandable pellet for inner cellular layer | | | | |
| Thermoplastic polymeric material | Low-density polyethylene | High-density polyethylene | Impact resistant polystyrene (rubber blend) | Low-density polyethylene |
| Melt index (g/10 min) | 7.0 | 13.0 | 19.0 | 9.0 |
| Young's modulus (kg/cm$^2$) | 3,000 | 15,000 | 35,000 | 2,500 |
| Blowing agent — name | Azodicarbonamide | Azodicarbonamide | Azodicarbonamide | p,p'-Oxybis-benzensulfonyl hydrazide |
| Blowing agent — concentration (%) | 2.0 | 2.0 | 2.0 | 2.0 |
| Particle size (mm) | 1–2 | 2–3 | 2–3 | 2–3 |
| Weight (kg) | 1.5 | 1.5 | 1.5 | 1.5 |
| Molding Condition | | | | |
| Temperature of air in oven (°C) | 300 | 350 | 250 | 250 |
| Heating period (min) | 17 | 15 | 15 | 15 |
| Evaluation of molded article | | | | |
| Outer cellular layer — thickness (mm) | 8 | 7 | 8 | 7 |
| Outer cellular layer — expansion ratio | 4 | 3 | 3.5 | 3 |
| Inner cellular layer — thickness (mm) | 5 | 5 | 6 | 5 |
| Inner cellular layer — expansion ratio | 5 | 5 | 6 | 5 |
| Needle test (after the testing procedure of Example 1) | Good | Good | Good | Good |

COMPARATIVE EXAMPLES 1 TO 4

In Table 2, there are shown the results of molding examples carried out, following, in principle, the procedure of Example 1 but under various conditions some of which did not conform to those specified herein. In Table 2, the condition marked with an asterisk does not conform to that specified herein.

Table 2

| Comparative Example No. | 1 | 2 | 3 | 4 |
|---|---|---|---|---|
| Expandable powder for outer cellular layer | | | | |
| Thermoplastic polymeric material | Low-density polyethylene | Ethylene-vinyl acetate copolymer | Ethylene-vinyl acetate copolymer | Ethylene-vinyl acetate copolymer |
| Melt index (g/10 min) | 7.0 | 4.0 | 4.0 | 4.0 |
| Elastic modulus (kg/cm$^2$) | 1,300* | 95 | 95 | 95 |
| Blowing agent — name | Azodicarbonamide | Azodicarbonamide | Azodicarbonamide | Azodicarbonamide |
| Blowing agent — concentration (%) | 1.0 | 1.0 | 1.0 | 1.0 |
| Particle size (μ) | 100–380 | 100–380 | 300–2,000* | 100–380 |
| Weight (kg) | 2.5 | 2.5 | 2.5 | 2.5 |
| Expandable pellet for inner cellular layer | | | | |
| Thermoplastic polymeric material | High-density polyethylene | none* | High-density polyethylene | High-density polyethylene |
| Melt index (g/10 min) | 7.0 | | 7.0 | 7.0 |
| Young's modulus (kg/cm$^2$) | 12,000 | | 12,000 | 12,000 |
| Blowing agent — name | Azodicarbonamide | | Azodicarbonamide | none* |
| Blowing agent — concentration (%) | 1.5 | | 1.5 | |
| Particle size (mm) | 2 | | 2 | 2 |
| Weight (kg) | 1.5 | | 1.5 | 1.5 |
| Molding conditions | | | | |
| Temperature of air in oven (°C) | 350 | | 350 | 350 |
| Heating period (min) | 15 | | 15 | 20 |
| Evaluation of molded article | | | | |
| Outer cellular layer — Thickness (mm) | 6 | | | 6 |
| Outer cellular layer — expansion ratio | 3 | | | 3 |
| Inner cellular layer — thickness (mm) | 5 | | | 4 |
| Inner cellular layer — expansion ratio | 5 | | | 1 |
| Needle test (after the testing procedure of Example 1) | Poor (difficulty prickable; pinholes remain open) | Good | Poor (locally different) | Poor (Stuck pin unstable due to coarse cell) |

Table 2 – Continued

| Comparative Example No. | | 1 | 2 | 3 | 4 |
|---|---|---|---|---|---|
| Drop test | (after the testing procedure of Example 1) | Partially deforms | Good | Partially deforms | Good |
| Miscellaneous | | | Yields under thumb pressure; support for form cannot be anchored | Diffused boundary between outer and inner layers | Slow molding; coarse cells in outer layer; heavy weight |

Depending upon the importance of the item of manufacturing condition deviated from that specified herein as well as upon the degree of deviation, various defects were developed in the end products as given in Table 2, in the lines itemized as "evaluation" and "miscellaneous".

What is claimed is:

1. A dress form comprising a layered wall having the external form of a human torso and having an outer cellular layer and integral thereto an inner cellular layer;
  a. said outer cellular layer having an expansion ratio of from 2 to 20 and comprising a thermoplastic polymeric material having an elastic modulus of 500 to 10 kg/cm² and selected from the group consisting of ethylene-vinyl acetate copolymers, ethylene-acrylate copolymers, and ethylene-methacrylate copolymers; and
  b. said inner layer comprising a thermoplastic polymeric material having a Young's modulus of 2,000 to 50,000 kg/cm².

2. The dress form of claim 1 wherein
  a. said outer cellular layer has an expansion ratio of from 2 to 20, a thickness of 2 to 20 mm, and is an ethylene-vinyl acetate copolymer having 7 to 40 percent dry weight vinyl acetate units; and
  b. said inner layer has a thickness of 3 to 30 mm and is a high density or low density polyethylene of an expansion ratio of 2 to 10.

3. The dress form according to claim 2 wherein the ethylene-vinyl acetate copolymer has 10–35 percent dry weight vinyl acetate units.

* * * * *